United States Patent
Höhne (10) Patent No.: US 10,732,985 B2
(45) Date of Patent: Aug. 4, 2020

(54) INFORMATION AND ENTERTAINMENT SYSTEM FOR A VEHICLE

(71) Applicant: VOLKSWAGEN AKTIENGESELLSCHAFT, Wolfsburg (DE)

(72) Inventor: Sven Höhne

(73) Assignee: VOLKSWAGEN AKTIENGESELLSCHAFT (DE)

( * ) Notice: Subject to any disclaimer, the term of this patent is extended or adjusted under 35 U.S.C. 154(b) by 171 days.

(21) Appl. No.: 15/559,088

(22) PCT Filed: Nov. 13, 2015

(86) PCT No.: PCT/EP2015/076535
§ 371 (c)(1),
(2) Date: Sep. 18, 2017

(87) PCT Pub. No.: WO2016/150528
PCT Pub. Date: Sep. 29, 2016

(65) Prior Publication Data
US 2018/0246727 A1      Aug. 30, 2018

(30) Foreign Application Priority Data

Mar. 25, 2015   (DE) .................. 10 2015 205 378

(51) Int. Cl.
*G06F 9/44* (2018.01)
*G06F 9/4401* (2018.01)
(Continued)

(52) U.S. Cl.
CPC .......... *G06F 9/4401* (2013.01); *B60W 50/06* (2013.01); *B60W 50/085* (2013.01); *G06F 9/445* (2013.01);
(Continued)

(58) Field of Classification Search
CPC .... G06F 9/44502; G06F 9/44508; G06F 1/24; G06F 9/44526; G06F 15/177;
(Continued)

(56) References Cited

U.S. PATENT DOCUMENTS 6,801,994 B2   10/2004   Beckert et al.
7,373,493 B2    5/2008   Hsu
(Continued)

FOREIGN PATENT DOCUMENTS

DE   102004055051 B3   10/2005
EP       1944690 A2    7/2008
(Continued)

OTHER PUBLICATIONS

Office Action for Korean Patent Application No. 10-2017-0729694; dated Dec. 19, 2018.
(Continued)

*Primary Examiner* — Zahid Choudhury
(74) *Attorney, Agent, or Firm* — Barnes & Thornburg LLP (57) ABSTRACT

An information and entertainment system of a vehicle providing a number of functions that can be used by a user of the vehicle. In the method, an order of priority of the multiple functions is set by the user, wherein the order of priority states a time availability of the functions desired by the user after an activation of the information and entertainment system. In accordance with the set order of priority, the multiple functions are carried out after a starting of the information and entertainment system, and sub-functions of the multiple functions can be immediately made available.

19 Claims, 3 Drawing Sheets

(51) Int. Cl.
*G06F 9/445* (2018.01)
*B60W 50/08* (2020.01)
*B60W 50/06* (2006.01)
*G06F 9/48* (2006.01)

(52) U.S. Cl.
CPC .... *G06F 9/4881* (2013.01); *B60K 2370/1438* (2019.05); *B60Y 2400/92* (2013.01)

(58) Field of Classification Search
CPC ............. G06F 9/44514; G06F 9/44523; G06F 11/1417; G06F 9/44505
See application file for complete search history.

(56) References Cited

U.S. PATENT DOCUMENTS

| | | | |
|---|---|---|---|
| 9,789,763 B1* | 10/2017 | Khoo | B60K 35/00 |
| 10,248,607 B1* | 4/2019 | Davis | G06F 13/4221 |
| 2005/0149938 A1 | 7/2005 | Choi | |
| 2007/0121665 A1 | 5/2007 | Ergan et al. | |
| 2011/0113219 A1* | 5/2011 | Golshan | G06F 9/44505 |
| | | | 712/30 |
| 2013/0311762 A1 | 11/2013 | Bank et al. | |
| 2014/0121509 A1* | 5/2014 | Mansker | A61B 5/0035 |
| | | | 600/427 |
| 2014/0222341 A1* | 8/2014 | Rathi | G01C 21/362 |
| | | | 701/538 |
| 2015/0106609 A1* | 4/2015 | Koszek | G06F 9/4401 |
| | | | 713/2 |
| 2016/0321080 A1* | 11/2016 | Cepuran | G06F 9/4401 |
| 2018/0074828 A1* | 3/2018 | Xiao | G06F 9/4401 |

FOREIGN PATENT DOCUMENTS

| | | |
|---|---|---|
| JP | 2010079566 A | 4/2010 |
| KR | 20050064262 A | 6/2005 |

OTHER PUBLICATIONS

Search Report for International Patent Application No. PCT/EP2015/076535, dated Feb. 9, 2016.

* cited by examiner

INFORMATION AND ENTERTAINMENT SYSTEM FOR A VEHICLE

PRIORITY CLAIM

This patent application is a U.S. National Phase of International Patent Application No. PCT/EP2015/076535, filed 13 Nov. 2015, which claims priority to German Patent Application No. 10 2015 205 378.4, filed 25 Mar. 2015, the disclosures of which are incorporated herein by reference in their entireties.

SUMMARY

Illustrative embodiments relate to a method for an information and entertainment system of a vehicle, what is known as an infotainment system. Illustrative embodiments also relate to an information and entertainment system for a vehicle and to a vehicle comprising an information and entertainment system.

BRIEF DESCRIPTION OF THE DRAWINGS

The disclosed embodiments are described in detail below with reference to the drawings, in which.

DETAILED DESCRIPTION

In modern vehicles, display systems of ever larger surface area are being used, for instance, touchscreens, which are flat-screens that have touch-sensitive surfaces. In addition, the number of functions controlled via these operation and display systems constantly rises. Thus there is also an increase in the demands made of processing units that are connected to the operation and display systems and that execute the functions. These processing units take a certain period of time to start up, during which the operation and display system cannot be used. In complex infotainment systems, this time period may lie in the region of several minutes until all the functions are available.

The larger display systems require considerable installation space, for instance, in the center console of the vehicle. This means that controls that were previously discrete control components are often integrated in the display and control system. These can include, for example, controls for the air conditioning system or seat adjustment. For some functions, however, for instance, functions such as adjusting the seat or adjusting the air conditioning system, it is desirable that these functions are immediately available after entry to the vehicle, for example, after switching on the ignition.

In this context, DE 10 2004 055 051 B3 discloses a fast system start-up for an embedded system. In a method to speed up a start-up procedure of an application containing a large amount of software, all the necessary loading procedures and configuration procedures of the application are performed such that the status of data memory and of processor registers defines an executable status of the application. The system that has been preloaded in this way is stopped, and the contents of the data memory and the processor registers are stored in a non-volatile manner. For future loading procedures, only some of the contents of the data memory and of the processor registers, which contents have been stored in a non-volatile manner, are reconstructed in the processor system, while other parts of the non-volatile contents of the data memory are loaded.

U.S. Pat. No. 6,801,994 B2 relates to software management systems and methods for computing devices in the automotive sector. To perform a start-up procedure or "booting" of the computing device as quickly as possible, a copy of an object store is held in a non-volatile memory. The object store copy is obtained from a previous system start-up procedure. When the computing device is started up or powered up, only predetermined object store pages are loaded into a RAM memory from the non-volatile memory during booting. This results in fewer than all the object store pages being loaded during booting.

U.S. Pat. No. 7,373,493 B2 relates to start-up methods, or "boot" methods, for a computer system. The computer system boots from a partition that comprises an operating system in hibernation mode.

In the methods described above, the fast system start-up requires a non-volatile memory that must be of considerable size given the growing number of system functions. In addition, as the size of this non-volatile memory grows, so does the time needed to start up the system from the non-volatile memory.

Disclosed embodiments provide an improved and fast start-up performance of an infotainment system of a vehicle.

Disclosed embodiments provide a method for an information and entertainment system of a vehicle, an information and entertainment system, and a vehicle.

The disclosed embodiments provide a method for an information and entertainment system of a vehicle. The information and entertainment system is also referred to as an infotainment system. The information and entertainment system provides a plurality of functions that can be used by a user of the vehicle. For example, the infotainment system can provide a navigation function, a music or video playback function, a radio function, a mobile radio communications function and functions for operating vehicle components such as, for instance, an air conditioning system or a seat adjuster of the vehicle. In the method, the user sets an order of priority for the plurality of functions. The order of priority defines a time of availability required by the user for the functions after the information and entertainment system is switched on. The plurality of functions are executed according to the set order of priority after a start-up of the information and entertainment system. The user can set the order of priority of the plurality of functions via a suitable user interface using, for example, a configuration menu of the information and entertainment system. Since different users may have different preferences for using the functions of the information and entertainment system, these user preferences can be taken into account by executing the functions according to the set order of priority. For example, it may be more important to one user that the navigation system is available as quickly as possible, whereas another user may attach more importance to being able to establish an Internet connection or adjust music playback as quickly as possible.

According to at least one disclosed embodiment, the order of priority is used as the basis for generating a start-up sequence in which the plurality of functions of the information and entertainment system are launched. The start-up sequence can largely correspond to the order of priority set by the user, although this sequence must take into account interdependencies of the various functions. Thus the start-up sequence may also differ from the order of priority set by the user. In addition, different functions may take a different length of time to launch, which again means that the start-up sequence may vary from the order of priority set by the user. The result required by the user can be guaranteed by taking into account these boundary conditions in generating the start-up sequence on the basis of the order of priority.

At least one function of the plurality of functions of the information and entertainment system can comprise a plurality of sub-functions, which can be launched separately from one another. For example, a navigation function can comprise a first sub-function for entering a navigation destination, a second sub-function for computing a route to the navigation destination and a third sub-function for issuing driving directions on the basis of the computed route.

According to at least one disclosed embodiment, after the information and entertainment system is switched on, the plurality of sub-functions of one of the plurality of functions are launched in a defined sub-function start-up sequence. In the aforementioned example of the navigation system, the function for entering the navigation destination, for instance, can be launched very early provided the availability of the navigation system enjoys a high priority in the order of priority set by the user. Since, however, setting the navigation destination by the user normally takes a certain amount of time, the sub-functions for computing the route and for issuing driving directions can be launched much later, and therefore other functions or sub-functions of other functions can be launched in the meantime. It is possible to delay even further the launch of the sub-function for issuing the driving directions of the navigation system, for instance, until the vehicle engine is started or until the vehicle starts to move. It is thereby possible to launch many functions at least in part, with the result that the user can be provided in a relatively short time with numerous functions immediately or very quickly, at least to the extent that these functions can be used sufficiently from the viewpoint of the user.

In another disclosed embodiment, the information and entertainment system comprises at least a first processing device and a second processing device. The first processing device is a microprocessor controller, for example, which has a relatively small data memory and a relatively small data processing capacity. The second processing device may comprise a computer system, for example, that has a far greater data processing capacity and a far larger data memory than the first processing device. The first processing device can therefore execute only relatively simple functions but can be started up far more quickly than the second processing device, for instance, within a few seconds, whereas the second processing device, which can execute far more complex functions and applications, needs far more time to start up a suitable operating system and launch the functions, for instance, a minute or several minutes. As previously explained, the plurality of functions of the information and entertainment system can each comprise a plurality of sub-functions. At least one of the sub-functions is executed on the first processing device, and all the sub-functions of a corresponding function are executed on the second processing device. In other words, a function is executed in full on the second processing device, and at least one sub-function of this function is executed in parallel therewith on the first processing device.

Since, in general, the first processing device can launch at least sub-functions more quickly than the second processing device, as explained above, at least sub-functions are very quickly available via the first processing device, whereas the entire functionality of a function is available slightly later on the second processing device. If in setting the order of priority, a user has ranked the navigation function with high importance, for instance, high up in the order of priority, the sub-function for setting the navigation destination, for example, can be executed on the first processing device. This sub-function is thus available immediately after the information and entertainment system starts up. Although the full functionality of the navigation system is not available until later, this does not matter in general to the user because the user needs a significant amount of time anyway to set the navigation destination.

In another example, the user sets a high priority for the media playback, for instance, in the order of priority. A sub-function of the media playback may comprise, for example, selecting the medium, so, for instance, radio, stored videos or stored music. The first processing device can provide this sub-functionality shortly after the information and entertainment system starts up. If the user selects the radio as the information source, for instance, the first processing device can activate a radio receiver and the radio playback can be started immediately. If, on the other hand, the user selects playback of stored video or music data, the first processing device can issue relevant information that associated data is still being loaded. As soon as the second processing device has launched the relevant media playback function, the desired media playback can begin.

According to another disclosed embodiment, the information and entertainment system comprises an operating device, which can be connected selectively to the first processing device or to the second processing device to allow operation of functions that can be executed by the corresponding processing device. After the start-up of the information and entertainment system, the operating device is initially connected to the first processing device. This allows operation of the sub-functions that are executed by the first processing device, for instance, entering a destination location in a navigation system. The operating device is only connected to the second processing device once additional associated sub-functions or the entire function are being executed on the second processing device. This allows operation of the additional sub-functions or of all the sub-functions of the relevant function. The selective connection of the operating device to the first processing device or to the second processing device can be performed via a suitable switchover device, for example. The switchover device can be connected to additional processing devices, for instance, to a processing device that provides an image from a reversing camera so that an image from the reversing camera is displayed on the operating device, for instance, when reversing. The operating device may comprise a touch-sensitive screen, for instance, thereby allowing both the output of outputs from the functions of the information and entertainment system and the input of user inputs.

In another disclosed embodiment, the first processing device and the second processing device are connected to a control bus system of the vehicle, for instance, to an Ethernet of the vehicle or to a CAN-bus system. Devices outside the information and entertainment system can be controlled using the plurality of functions of the information and entertainment system via the control bus system. The devices outside the information and entertainment system may comprise, for instance, an air conditioning system of the vehicle or a seat adjuster of the vehicle. By virtue of both the first processing device and the second processing device being connected to the control bus system of the vehicle, basic functions such as adjusting the seat or adjusting the air conditioning system, for example, can be adjusted via both processing devices, for instance, by the first processing device while the second processing device has not yet fully started up and relevant functions are not yet available from the second processing device.

Moreover, the second processing device can additionally comprise an access device to a mobile radio communications network, for instance, to a radio-based voice and/or data communications network. Functions that are executed on the second processing device can access this access device to transmit voice data in a telephone call or receive streaming data for video or music playback.

The disclosed embodiments also provide an information and entertainment system for a vehicle. The information and entertainment system comprises an operating device for a user of the information and entertainment system to operate a plurality of functions of the information and entertainment system, and at least one processing device that is connected to the operating device and is able to execute the plurality of functions. The processing device is also able to set an order of priority of the plurality of functions on the basis of an input by the user. The order of priority defines a time of availability required by the user for the functions after the information and entertainment system is switched on. The processing device executes the plurality of functions according to the set order of priority after a start-up of the information and entertainment system. It is thereby possible to take into account requirements and wishes of a user regarding the availability of the functions provided by the information and entertainment system.

According to at least one disclosed embodiment, the at least one processing device comprises a first processing device and a second processing device. In addition, at least some functions of the plurality of functions have a structure comprising a plurality of sub-functions that can be executed or launched separately from one another. The first processing device is able to execute at least one sub-function of the plurality of sub-functions, and the second processing device is able to execute all the sub-functions. The operating device can be connected selectively to the first processing device or second processing device to allow operation of the functions or sub-functions that are executed by the corresponding processing device. After a start-up of the information and entertainment system, the operating device is initially connected to the first processing device. This allows operation of the sub-functions that are executed on the first processing device. The second processing device is connected to the operating device when additional sub-functions are being executed on the second processing device that go beyond the sub-functions of the first processing device. This allows operation of the additional sub-functions. In addition, the switchover from the first processing device to the second processing device can be performed such that a user does not notice any corresponding transition, with the result that it appears to the user that continuous use of the function is possible. The first processing device and the second processing device are connected to a control bus system of the vehicle, thereby allowing devices outside the information and entertainment system to be controlled using the plurality of functions or sub-functions both by the first processing device and by the second processing device.

The information and entertainment system can also be suitable for performing the method described above or embodiments thereof, and thus also includes the aforementioned benefits.

The disclosed embodiments also provide a vehicle comprising the information and entertainment system described above.

Although the embodiments described above have been specified separately from one another, the embodiments can be combined in any way.

Figure 1:
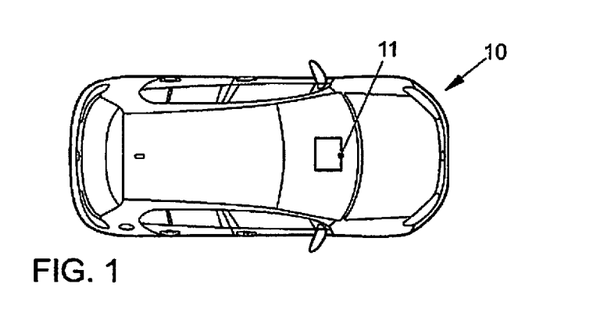
FIG. 1 shows schematically a vehicle according to a disclosed embodiment.

FIG. 1 shows a vehicle 10 comprising an information and entertainment system 11, which is installed in the vehicle 10 in the region of a center console or in the region of an instrument panel of the vehicle 10, for example. The information and entertainment system 11 can comprise, for example, a large-area touch-sensitive screen, on which information to be output from the information and entertainment system 11 can be displayed as text and graphics, and also on which controls can be displayed that can be operated by a user by touching the screen surface.

Figure 2:
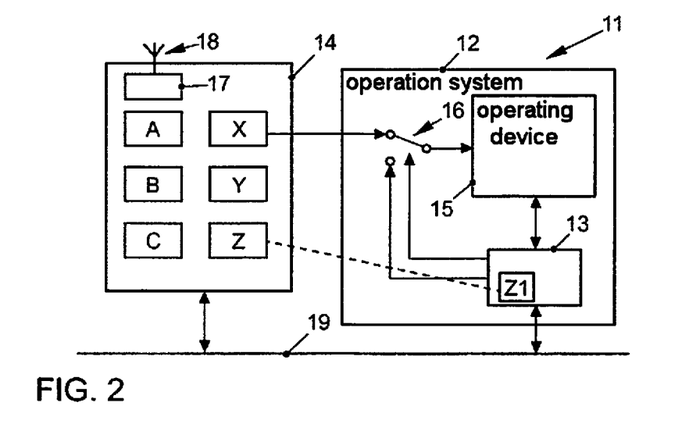
FIG. 2 shows schematically the structure of an information and entertainment system according to a disclosed embodiment.

FIG. 2 shows the information and entertainment system 11 in detail. The information and entertainment system 11 comprises an operation system 12, which comprises a first processing device 13, an operating device 15, for instance, a touch-sensitive screen, and a switchover device 16. The information and entertainment system also comprises a second processing device 14. The switchover device 16 can be used to route video information to the operating device 15 selectively from the first processing device 13 or from the second processing device 14, whereupon this information is displayed. The switchover device 16 can be controlled, for instance, by the first processing device 13. The first processing device 13 can also be connected to the operating device 15 to obtain operating information from the user. The first processing device 13 is, for example, a microprocessor controller or a piece of control hardware known as an FPGA. The second processing device 14 is a computer system, for example, comprising a processor, a main memory and a mass storage device. Both the first processing device 13 and the second processing device 14 are connected to a control bus system 19 of the vehicle, for instance, to an Ethernet system or a CAN-bus. The second processing device 14 comprises an access device 17, which can provide access to a mobile radio communications network via an antenna 18 for the radio-transmission of voice data or media data or other information, for example.

Figure 3:
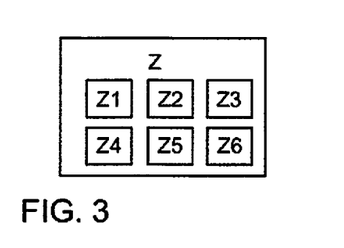
FIG. 3 shows a structure of a function that can be executed by an information and entertainment system according to a disclosed embodiment.

The information and entertainment system 11 is able to execute a multiplicity of functions, which are labelled in FIG. 2 as functions A, B, C, X, Y and Z. As shown in FIG. 3 using the function Z as an example, a function can consist of a plurality of sub-functions Z1, Z2, Z3, Z4, Z5 and Z6. In FIG. 3, the function Z comprises by way of example six sub-functions Z1-Z6, although it is obvious that each of the functions A-Z can consist of any number of sub-functions. This may also mean that one of the functions A-Z cannot be subdivided further and hence comprises only one sub-function, which encompasses the entire function. Some functions or sub-functions can be executed both by the second processing device 14 and by the first processing device 13. In the example of FIG. 2, the sub-function Z1 can be executed by the first processing device 13. If, for example, the function Z is a navigation function of the information and entertainment system 11, the sub-functions Z1-Z6 may, for instance, relate to a function for entering a navigation destination, a function for computing a route from the current position to the navigation destination, and a function for issuing driving directions on a map.

Additional sub-functions may, for example, relate to a function for determining current hold-ups on the route or a function for retrieving from the Internet interesting places along the computed route. Since the first processing device 13 has a lower processing capacity and less memory than the second processing device 14, computationally-intensive or memory-intensive functions or sub-functions such as, e.g., computing the route or displaying the route on a map can be performed solely in the second processing device 14. Likewise, functions that require data communication with traffic services or the Internet, for instance, can be performed only on the second processing device 14. By virtue of the simpler structure of the first processing device 13, however, the first processing device 13 can be started up more quickly and thus simple sub-functions, for instance, the sub-function for entering the navigation destination, can be executed earlier than on the second processing device 14.

The installation space in a vehicle is limited, in particular in the region of the center console or of the instrument panel. Functions of information and entertainment systems such as, e.g., navigation functions, multimedia playback or Internet applications require large screens in these regions, however. This means that there is less space available for controls. To solve this problem, controls can be embodied virtually using a touch-sensitive screen of the operating device 15. For instance, controls of an air conditioning system or of a seat adjuster can be displayed and operated in a suitable menu of the information and entertainment system 11. From the customer viewpoint it is desirable, however, that such functions are available immediately after getting in.

From the technical viewpoint, on the other hand, the information and entertainment system 11 takes a considerable length of time until the system has fully booted-up and all the functions are loaded and running. This can result in the user having to wait an unnecessarily long time to operate, for instance, the basic functions described above for air conditioning adjustment and seat adjustment. Standard information and entertainment systems offer the facility to operate preloaded and running functions while other functions are loaded and launched in the background.

With the large number of possible functions that can be executed by an information and entertainment system, however, it is difficult to specify a generally valid sequence for launching the functions that satisfies all users, because different users have different behavioral practices. To take account of this, it is provided in the information and entertainment system 11 that a user can set a desired order of priority for the time of availability of the functions. In other words, starting from a preset order of priority that existed on delivery of the vehicle, the user can give selectable functions a higher priority so that these functions are available earlier after a start-up of the information and entertainment system.

Figure 4:
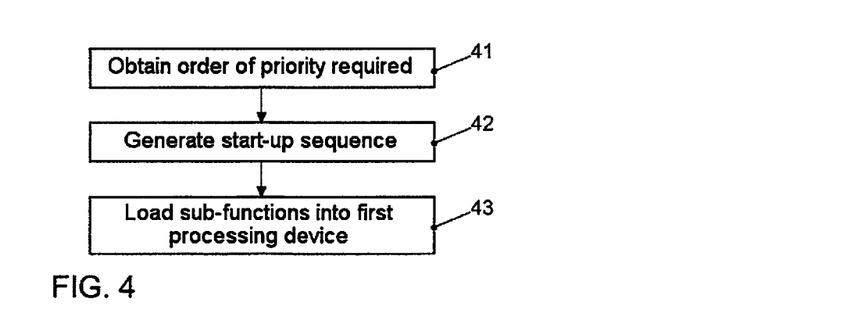
FIG. 4 shows method operations of a method according to a disclosed embodiment.

FIG. 4 shows corresponding method operations that are performed by the information and entertainment system 11 for this purpose. In operation at 41, the desired order of priority is obtained, for instance, using a graphical user interface on the operation system 12, while the information and entertainment system 11 is running. On the basis of the desired order of priority, in operation at 42 a start-up sequence is specified, which is stored in the information and entertainment system 11. This start-up sequence is used during the next start-up of the information and entertainment system 11, as will be explained later in connection with FIG. 6.

In addition, in operation at 43, defined sub-functions associated with the functions given higher priority are loaded into the first processing device 13 so that these sub-functions are available to the user in the shortest possible time when the information and entertainment system 11 is next started up. Thus the function(s) that the user has prioritized are displayed to the user and the user can make initial inputs, all in the shortest possible time. In this process, it can be possible to select from a predetermined range. The immediate or rapid availability can be referred to as a "hot button" function.

Figure 5:
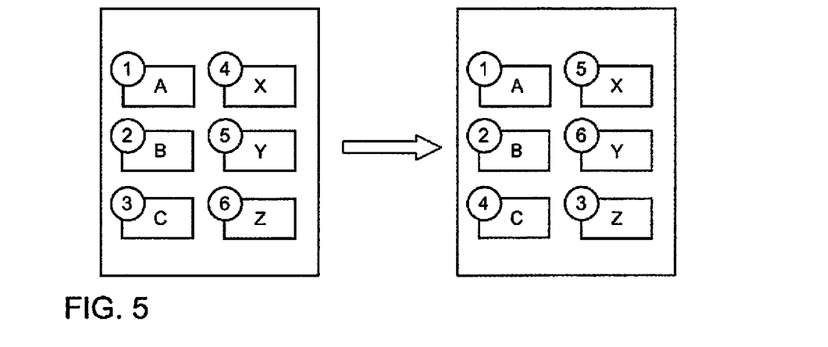
FIG. 5 shows setting an order of priority based on a method according to a disclosed embodiment.

FIG. 5 uses an example to illustrate altering the start-up sequence. In the delivery state of the information and entertainment system 11, the functions A, B, C, X, Y and Z are launched in the sequence indicated by the circled numbers on the left-hand side of FIG. 5. Thus function A is launched first, followed by function B, followed by function C, followed by function X, followed by function Y, and finally function Z is launched. The function Z relates to the navigation function, for example. The user has given the navigation function a high priority in the order of priority, i.e., the user wants this function to be available as early as possible. Dependencies between the functions can mean, however, that it is necessary to launch other functions before the navigation function, for instance, a database function A that allows the navigation function to access map material.

Thus, the navigation function Z is placed as near the front as possible in the start-up sequence, for instance, the navigation function Z is launched as the third function, as shown in the right hand-side of FIG. 5. To let the user nonetheless still have the earliest possible use of parts of the navigation function Z, the sub-function Z1 is additionally loaded into the first processing device 13. The sub-function Z1 relates to the input of the navigation destination. There may be additional functions loaded as standard in the first processing device 13, for instance, basic functions for seat adjustment or adjusting the air conditioning. Advanced functions for seat adjustment or adjusting the air conditioning may additionally be present in the second processing device 14, which are available later after a start-up of the information and entertainment system as soon as boot-up of the second processing device 14 is complete.

Basic functions of the seat adjustment, which are executed in the first processing device 13, may include, for example, shifting the seat forward and back, adjusting the height and adjusting the backrest. Additional functions of the seat adjustment, for instance, massage programs are available via suitable functions of the second processing device 14 as soon as boot-up of the second processing device 14 is complete.

Figure 6:
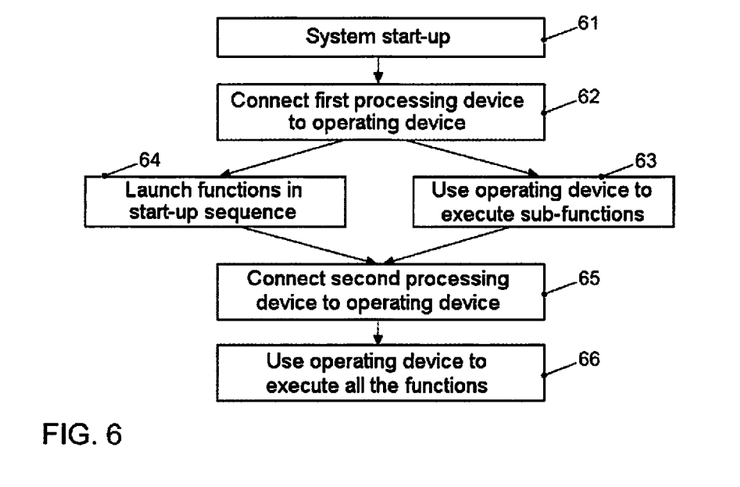
FIG. 6 shows further method operations of a method according to a disclosed embodiment.

FIG. 6 shows the start-up of the information and entertainment system 11 after it has been configured according to user requirements as explained above. The system start-up begins in operation at 61, i.e., the information and entertainment system 11 is supplied with electrical power. The first processing device 13, by virtue of its structure, can be booted up in a very short space of time and, in operation at 62, controls the switchover device 16 such that outputs from the first processing device 13 are displayed via the switchover device 16 on the operating device 15, for instance, on a touch-sensitive screen. In operation at 63, the functions and sub-functions, for instance, the sub-function Z1, that have been loaded into the first processing device 13, are executed and can be operated using the touch-sensitive screen. For instance, it is possible to adjust a seat or enter a navigation destination.

Parallel, in time therewith, in operation at 64, the second processing device 14 boots up and launches the functions according to the start-up sequence as was generated in operation at 42 of FIG. 4. As soon as the second processing device 14 has finished booting up and launching the functions, this situation is notified to the first processing device 13, which thereupon, in operation at 65, switches over the switchover device 16, with the result that the second processing device 14 is connected to the touch-sensitive screen. Now, in operation at 66, all the functions provided by the second processing device 14 can be executed.

The information and entertainment system 11 described above provides rapid availability of at least some basic functions. After opening the vehicle, the user gets in and immediately obtains a display and can operate initial functions. This is made possible by the first processing device 13 having the extremely short start-up time. In addition, the function that the user has previously prioritized is displayed to the user, and the user can make initial inputs, all in the shortest possible time. As was explained in connection with FIG. 4, in this process it is possible to select functions from a predetermined range. It should be noted here that it is not usually possible for all the functions to be prioritized in any order required.

For instance, for the example shown in FIG. 5, the user can only prioritize the functions X, Y and Z, whereas the functions A, B and C are not available for prioritization because, for instance, they require specific hardware or have dependencies in the functional start-up sequence. In addition, a simplified version or a sub-function of the prioritized functions, for instance, the sub-function Z1 of the prioritized function Z, is loaded into the first processing device 13 as a result of the prioritization. This function is hence available immediately. At the same time, the information and entertainment system 11 pushes the launch of the prioritized function as far forward as possible so that the full functionality of this function is attained as quickly as possible (see FIG. 5). As soon as the function is fully available in the system, operation of the function is transferred from the first processing device 13 to the second processing device 14, for example, via the switchover device 16. This can be done without the user noticing given a suitable design of the user interfaces.

LIST OF REFERENCES

10 vehicle
11 information and entertainment system
12 operation system
13 first processing device
14 second processing device
15 operating device
16 switchover device
17 access device
18 antenna
19 control bus system
41-43 operation
61-66 operation

The invention claimed is:

1. A method for an information and entertainment system of a vehicle, wherein the information and entertainment system provides to a user of the vehicle, the method comprising:
setting an order of priority for the plurality of functions by the user, wherein the order of priority defines a time of availability required by the user for the functions after the information and entertainment system is switched on, wherein a first subset of functions are capable of prioritization or de-prioritization by the user, and wherein a second subset of functions are assigned an initial order and are capable only of de-prioritization by the user;
generating a start-up sequence based on the order of priority and one or more interdependencies of the plurality of functions;
executing the plurality of functions according to the start-up sequence after a start-up of the information and entertainment system;
starting up a first processing device and a second processing device, as a part of the start-up of the information and entertainment system, wherein the first processing device starts up more quickly than the second processing device; and
executing one or more functions of the plurality of functions on the first processing device while the second processing device is still starting up and operating a switchover to switch execution of the one or more functions to the second processing device after start-up of the second processing device.

2. The method of claim 1, wherein the execution of the plurality of functions after the information and entertainment system is switched on comprises launching the plurality of functions in the start-up sequence.

3. The method of claim 1 wherein at least one function of the plurality of functions comprises a plurality of sub-functions, configured to be launched separately from one another, wherein the execution of the at least one function after the information and entertainment system is switched on comprises launching the associated plurality of sub-functions in a defined sub-function start-up sequence.

4. The method of claim 1, wherein the information and entertainment system comprises at least the first processing device and the second processing device, wherein at least one function of the plurality of functions comprises a plurality of sub-functions, wherein the execution of the at least one function after the information and entertainment system is switched on comprises executing at least one sub-function of the associated plurality of sub-functions on the first processing device, and executing all the associated sub-functions on the second processing device.

5. The method of claim 4, wherein the information and entertainment system comprises an operating device, wherein the operating device is connected selectively to the first processing device or to the second processing device to operate functions executed by the corresponding processing device, wherein the operating device is initially connected to the first processing device, thereby allowing operation of the at least one sub-function that is executed by the first processing device, and the operating device is only connected to the second processing device once additional associated sub-functions are being executed on the second processing device, thereby allowing operation of additional sub-functions.

6. The method of claim 5, wherein the operating device comprises a touch-sensitive screen.

7. The method of claim 4, wherein the first processing device and the second processing device are connected to a control bus system of the vehicle to control devices outside the information and entertainment system using the plurality of functions of the information and entertainment system.

8. The method of claim 4, wherein the second processing device comprises:
an access device to a mobile radio communications network;

a data storage device that is larger than a data storage device of the first processing device; and/or a data processing capacity that is greater than a data processing capacity of the first processing device.

9. An information and entertainment system for a vehicle, the system comprising:

an operating device for a user of the information and entertainment system to operate a plurality of functions of the information and entertainment system;

at least first and second processing devices connected to the operating device to execute the plurality of functions, wherein the at least one processing device sets an order of priority of the plurality of functions by an input by the user, wherein the order of priority defines a time of availability required by the user for the functions after the information and entertainment system is switched on, generates a start-up sequence based on the order of priority and one or more interdependencies of the plurality of functions, and executes the plurality of functions according to the start-up sequence after a start-up of the information and entertainment system, wherein a first subset of functions are capable of prioritization or de-prioritization by the user, and a second subset of functions are assigned an initial order and are capable only of de-prioritization by the user, and wherein the first processing device starts up more quickly than the second processing device, and one or more functions of the plurality of functions are executed on the first processing device while the second processing device is still starting up; and a switchover that operates to switch connection of the operating device from the first processing device to the second processing device after start-up of the second processing device.

10. The information and entertainment system of claim 9, wherein the at least one processing device comprises a first processing device and a second processing device, wherein at least one function of the plurality of functions comprises a plurality of sub-functions, wherein the first processing device executes at least one sub-function of the plurality of sub-functions, and the second processing device executes all the sub-functions, wherein the operating device is connected selectively to the first processing device or to the second processing device to operate functions that are executed by the corresponding processing device, wherein the operating device is initially connected to the first processing device, thereby allowing operation of the at least one sub-function that is executed by the first processing device, and the operating device is only connected to the second processing device once additional associated sub-functions are being executed on the second processing device, thereby allowing operation of additional sub-functions, wherein the first processing device and the second processing device are connected to a control bus system of the vehicle to control devices outside the information and entertainment system using the plurality of functions of the information and entertainment system.

11. The information and entertainment system of claim 9, wherein the information and entertainment system performs a method of operating the information and entertainment system of the vehicle, wherein the information and entertainment system provides the plurality of functions to the user of the vehicle, the method comprising:

setting the order of priority for the plurality of functions by the user, wherein the order of priority defines the time of availability required by the user for the functions after the information and entertainment system is switched on; and executing the plurality of functions according to the start-up sequence of the information and entertainment system.

12. A vehicle comprising an information and entertainment system as claimed in claim 11.

13. The information and entertainment system of claim 11, wherein the execution of the plurality of functions after the information and entertainment system is switched on comprises launching the plurality of functions in the start-up sequence.

14. The information and entertainment system of claim 11, wherein at least one function of the plurality of functions comprises a plurality of sub-functions, configured to be launched separately from one another, wherein the execution of the at least one function after the information and entertainment system is switched on comprises launching the associated plurality of sub-functions in a defined sub-function start-up sequence.

15. The information and entertainment system of claim 11, wherein the information and entertainment system comprises at least a first processing device and a second processing device, wherein at least one function of the plurality of functions comprises a plurality of sub-functions, wherein the execution of the at least one function after the information and entertainment system is switched on comprises executing at least one sub-function of the associated plurality of sub-functions on the first processing device, and executing all the associated sub-functions on the second processing device.

16. The information and entertainment system of claim 15, wherein the information and entertainment system comprises an operating device, wherein the operating device is connected selectively to the first processing device or to the second processing device to operate functions executed by the corresponding processing device, wherein the operating device is initially connected to the first processing device, thereby allowing operation of the at least one sub-function that is executed by the first processing device, and the operating device is only connected to the second processing device once additional associated sub-functions are being executed on the second processing device, thereby allowing operation of additional sub-functions.

17. The information and entertainment system of claim 14, wherein the operating device comprises a touch-sensitive screen.

18. The information and entertainment system of claim 14, wherein the first processing device and the second processing device are connected to a control bus system of the vehicle to control devices outside the information and entertainment system using the plurality of functions of the information and entertainment system.

19. The information and entertainment system of claim 14, wherein the second processing device comprises:

an access device to a mobile radio communications network;

a data storage device that is larger than a data storage device of the first processing device; and/or a data processing capacity that is greater than a data processing capacity of the first processing device.

* * * * *